US012650953B2

(12) United States Patent
Naik et al.

(10) Patent No.: US 12,650,953 B2
(45) Date of Patent: Jun. 9, 2026

(54) TECHNIQUE FOR PROVIDING CUSTOM NAMESPACES ON A FILE SYSTEM

(71) Applicant: Nutanix, Inc., San Jose, CA (US)

(72) Inventors: Manoj Premanand Naik, San Jose, CA (US); Pradeep Thomas, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/076,626

(22) Filed: Dec. 7, 2022

(65) Prior Publication Data

US 2024/0193128 A1     Jun. 13, 2024

(51) Int. Cl.
*G06F 16/17*      (2019.01)
*G06F 16/14*      (2019.01)
*G06F 16/16*      (2019.01)
*G06F 16/185*     (2019.01)

(52) U.S. Cl.
CPC .......... *G06F 16/173* (2019.01); *G06F 16/148* (2019.01); *G06F 16/164* (2019.01); *G06F 16/185* (2019.01)

(58) Field of Classification Search
CPC .... G06F 16/173; G06F 16/164; G06F 16/148; G06F 16/185
See application file for complete search history.

(56) References Cited

U.S. PATENT DOCUMENTS 7,725,507 B1 *  5/2010  van Rietschote ....... G06F 16/10
                                                          707/828
8,549,518 B1   10/2013  Aron et al.

8,601,473 B1   12/2013  Aron et al.
8,850,130 B1    9/2014  Aron et al.
8,863,124 B1   10/2014  Aron et al.
9,009,106 B1    4/2015  Aron et al.
                  (Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Khanh B Pham
*Assistant Examiner* — Ranjit P Doraiswamy
(74) *Attorney, Agent, or Firm* — Cesari and McKenna, LLC

(57) ABSTRACT

A technique extends a file system infrastructure of a storage system to provide a custom namespace within a pathname of a logical construct configured to invoke semantically inter-pretative context as a command embedded in a data access protocol request issued by a client and directed to the logical construct served by the storage system, without alteration to the data access protocol. The extension includes a "plug-in" engine of a data access protocol server executing on a network protocol stack of the storage system. The engine operates to extract a pathname from the request to determine whether the custom namespace incorporating the command is present and directed to the logical construct. If so, the engine semantically interprets the command within a context of the custom namespace to essentially convert the com-mand to one or more predefined operations directed to the logical construct. The storage system then performs the operations and returns the results to the client.

30 Claims, 4 Drawing Sheets

(56) References Cited

U.S. PATENT DOCUMENTS

| | | | |
|---|---|---|---|
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 11,436,097 B1 | 9/2022 | Kumar et al. | |
| 12,321,454 B1* | 6/2025 | Berninger | G06F 21/566 |
| 2012/0173489 A1* | 7/2012 | Hardee | G06F 16/16 |
| | | | 707/640 |
| 2012/0216299 A1* | 8/2012 | Frank | G06F 21/6227 |
| | | | 726/29 |
| 2013/0046801 A1* | 2/2013 | Chandler | G06F 16/16 |
| | | | 707/822 |
| 2022/0188042 A1 | 6/2022 | Tatiparthi et al. | |
| 2022/0217204 A1 | 7/2022 | Tatiparthi et al. | |
| 2022/0244856 A1 | 8/2022 | Kataria et al. | |
| 2022/0253243 A1 | 8/2022 | Kataria et al. | |
| 2022/0269571 A1 | 8/2022 | Mantri et al. | |
| 2022/0358087 A1 | 11/2022 | Gupta et al. | |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Poitras, Steven "The Nutanix Bible" from http:/stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https:/nutanixbible.com/, dated Sep. 9, 2022, 262 pages.

* cited by examiner

TECHNIQUE FOR PROVIDING CUSTOM NAMESPACES ON A FILE SYSTEM

BACKGROUND

Technical Field

The present disclosure relates to namespaces of storage systems and, more specifically, to a custom namespace for protocols used to access logical constructs served by a file system of a storage system.

Background Information

A storage system typically provides storage and management of unstructured data as logical constructs, such as files or directories, which are usually served to user applications (clients) via various well-known data access (e.g., file system) protocols, such as network file system (NFS) and server message block (SMB). The logical constructs may be organized as a group and presented (exported) by the storage system as a namespace of logical constructs accessible to a client by name within a file system, e.g., file system infrastructure, of the system. The client may request access to the data of the constructs using commands (such as open file, create file, delete file, remove directory) embedded in packets (file system protocol requests) transferred over a network to the storage system.

When post-processing of a logical construct, such as a file, of the namespace is required, the client typically performs operations such as, e.g., fetching the file from the storage system using one or more file system protocol requests over the network and performing computations on the fetched file at the client. For metadata operations, the client may recursively perform the required operations and filter results (e.g., find files with certain extensions, pattern match on file names and pattern match within the content). Such client-side processing increases the time for performing the operations and network usage, as well as the load on the storage system as it may have to respond to a number of requests.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
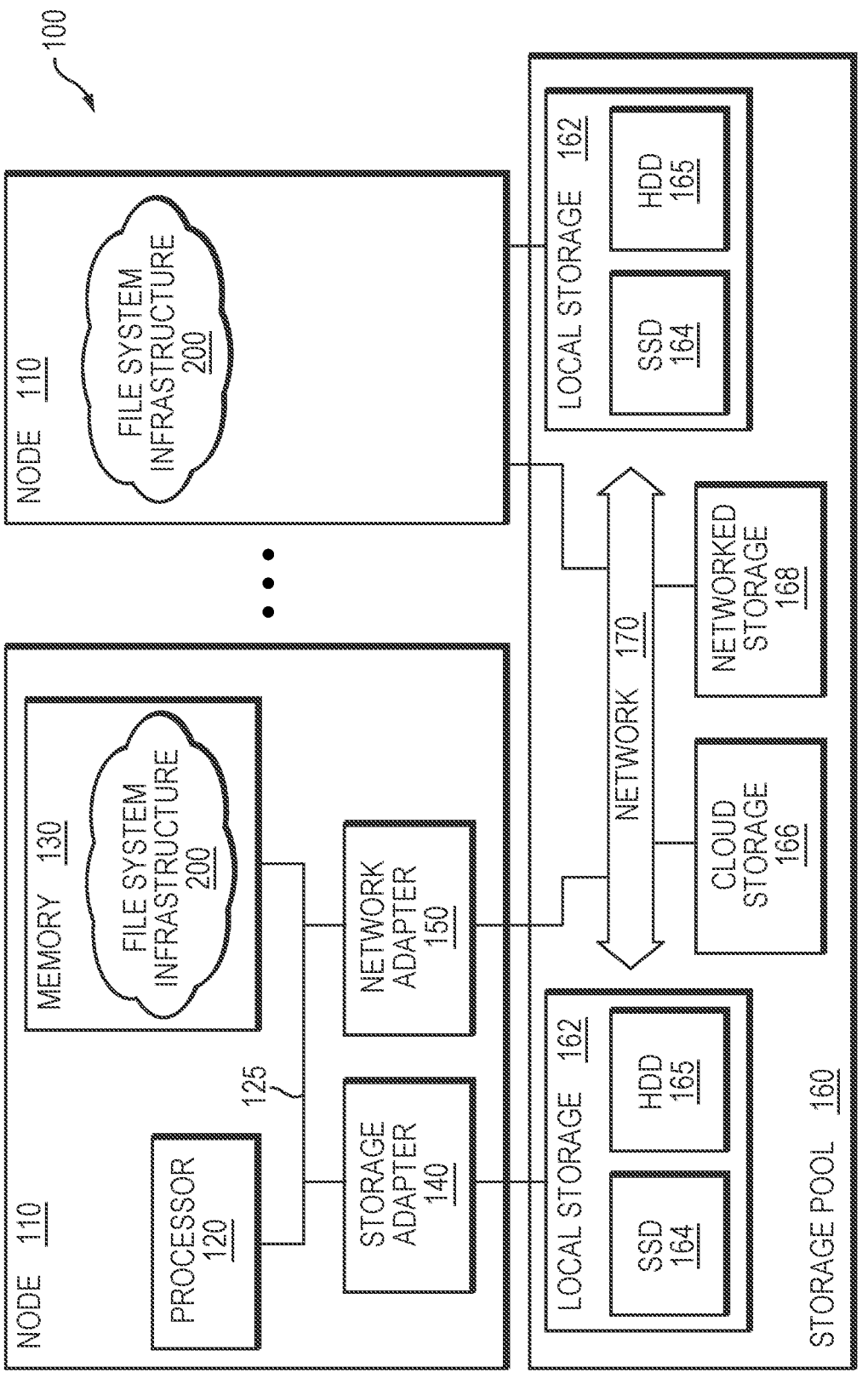
FIG. 1 is a block diagram of a plurality of interconnected nodes of a storage system.

The embodiments described herein are directed to a technique that extends a file system infrastructure of a storage system to provide a custom namespace within a pathname of a logical construct (e.g., a file or directory) configured to invoke semantically interpretative context as a command embedded in a data access protocol (e.g., NFS) request issued by a client and directed to the logical construct (e.g., the file or directory) served by the storage system, without alteration to the data access protocol. The extension includes a "plug-in" engine of a data access protocol server executing on a network protocol stack of the storage system. The engine operates to extract a pathname from the request to determine whether the custom namespace incorporating the command is present and directed to the logical construct, e.g., a directory or file. In addition, the network protocol stack on the server requires only minimal change to accommodate extraction of the pathname from a request for processing of the custom namespace, i.e., the engine extracts a command within custom namespace of the file system infrastructure.

If the custom namespace is present, the engine semantically interprets the command within a context of the custom namespace, i.e., the engine essentially converts the command to one or more predefined operations directed to the logical construct to offload the need for numerous data access protocol requests to perform those operations from the client. Note that the predefined operations may be complex or compound actions (e.g., scripts or code) applied to the logical construct. The storage system then performs the operations and returns the results to the client, which appear semantically as a single operation.

Advantageously, the technique described herein provides functionality to off-load repeated data access protocol request(s) with concomitant post-processing operations from a client to the storage system using custom namespaces within pathnames of the request(s) to effectively extend the functionality of the request(s) at the server without otherwise changing a layout of the messages for the data access protocol (e.g., by encoding an extractable command within a custom namespace of the pathname in the request). That is, the technique provides predefined operations for execution on the system when accessing a logical construct (e.g., file or directory) via a pathname directed to the custom namespace, which operations would otherwise be performed at the client and issued as numerous data access protocol requests to the server. A filtered result of the operations may then be provided to the client. The technique thus conserves (saves) network bandwidth as well as compute resources (and time) on the client (as well as the storage system) by essentially reducing data protocol access requests issued from the client to a single request for ganged operations on the stored data at the storage system. In other words, the technique essentially moves a compute cluster from the client to the storage system through the use of custom namespaces associated with predefined operations that are more efficiently performed as a gang operation on the storage system.

DESCRIPTION

FIG. 1 is a block diagram of a plurality of nodes 110 interconnected as a storage system 100 and configured to provide compute and storage services for information, i.e., data and metadata, stored on storage devices. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a storage pool 160, referred to as scale-out converged storage (SOCS). To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the storage system 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network 170 may be effected by exchanging discrete frames or packets of data according to network protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software that provides a virtualization system (such as, e.g., a file system infrastructure 200), and manipulate the data structures. It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
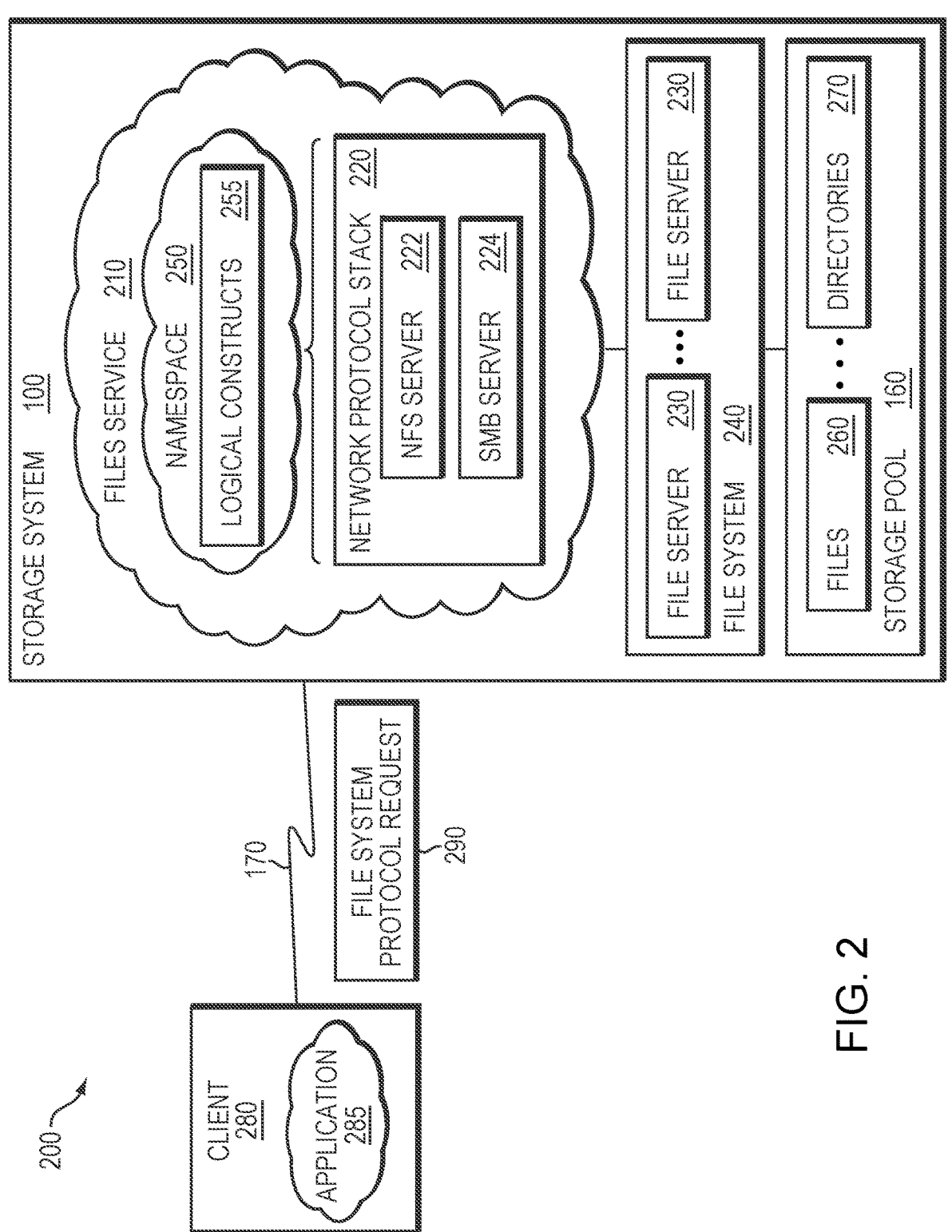
FIG. 2 is a block diagram of a file system infrastructure.

FIG. 2 is a block diagram of the file system infrastructure that may be advantageously used with the embodiments described herein. The file system infrastructure 200 operates in connection with a storage service (e.g., a files service 210) to provide support for storage platforms including one or more file servers 230 of a file system 240 coupled to storage pool 160. In addition, the files service 210 interoperates with the different data access (e.g., file system) protocols which remain unmodified so that, e.g., various storage environments including cloud provider-based storage may also be used. To that end, the files service 210 includes a network protocol stack 220 having one or more file system protocol servers, such as a Network File System (NFS) protocol server 222 and a Server Message Block (SMB) protocol server 224.

In an embodiment, the files service 210 provided by the storage system 100 relates to the organization of information on writable persistent storage devices, such as SSDs 164 and HDDs 165. When deployed within a NAS environment, the storage system 100 may be embodied as file server 230 including virtualization software configured to implement file system 240 to logically organize the information as a hierarchical structure of logical constructs 255, such as files 260 and directories 270, stored on, e.g., the storage devices of storage pool 160. Each "on-disk" file 260 may be implemented as a set of data structures, e.g., storage blocks, configured to store information, such as the actual data for the file. A directory 270, on the other hand, may be implemented as a specially formatted file in which information about other files and directories are stored. As used herein a file 260 is a logical construct 255 that contains a fixed or variable amount of data storage space, and that may be allocated storage out of storage pool 160 of available data storage space. The file system 240 is configured to manage such files 260, including the allocation of fixed storage space to store the files on a temporary or permanent basis.

The storage system 100 may be further configured to operate according to a client/server model of information delivery to thereby allow one or more client systems (clients 280) to access shared resources, e.g., logical constructs such as files 260 and directories 270, stored on the system. The logical constructs may be organized as a group and presented (exported) by the storage system 100 as a namespace 250 of logical constructs 255 accessible to a client 280 by name within the file system infrastructure 200 of the system. The client 280 may be a general-purpose computer configured to interact with the storage system 100 to request the services of the system, which may perform the services and return results of the services requested by the client. Sharing of logical constructs 255 is a hallmark of a NAS environment, which is enabled because of its semantic level of access to the logical construct information in the form of files 260 and directories 270. The client 280 typically communicates with the storage system 100 by exchanging discrete network protocol packets or requests for logical construct data according to predefined file system protocols.

In the client/server model, the client 280 may include an application 285 executing on a computer that "connects" to the storage system 100 over network 170. The storage (e.g., NAS) system 100 generally utilizes file system access protocols; therefore, the client 280 may request the services of the storage system by issuing one or more file system protocol requests 290 to the file system 240 over the network 170 identifying one or more logical constructs 255 (e.g., files 260 and/or directories 270) of the namespace 250 to be accessed typically without regard to specific locations, e.g., blocks, in which the data are stored on the storage devices of the storage pool 160. By supporting a plurality of file system protocols, such as the NFS and SMB protocols, as well as the Common Internet File System (CIFS) protocol, the utility of the storage system 100 may be enhanced for networking clients 280.

Operationally, a file system protocol request 290 from the client 280 is forwarded via one or more packets over the computer network 170 and onto the storage system 100 where it is received at the network adapter 150. A network driver processes the packet(s) and, if appropriate, passes it on to a file system protocol server, e.g., NFS server 222 or SMB server 224, of the network protocol stack 220 for additional processing prior to forwarding to the file system 240. Illustratively, the file system generates operations to load (retrieve) the requested information (e.g., file or directory) from storage devices of the storage pool 160 (if the information is not resident in memory) into memory 130 for processing by the storage system. Upon completion of the request, the storage system 100 returns a reply to the client 280 over the network 170.

When post-processing of a logical construct 255, such as a file 260, of the namespace 250 is required, the client 260 typically performs operations such as, e.g., fetching the file from the storage system 100 using one or more file system protocol requests 290 over the network 170 and performing computations on the fetched file at the client 280. For metadata operations, the client 280 may recursively perform the required operations and filter results (e.g., find files with certain extensions and pattern match against file names). Such client-side processing increases the time for performing the operations and network usage, as well as the load on the storage system 100 as it may have to respond to a number of requests.

The embodiments described herein are directed to a technique that extends the file system infrastructure 200 of storage system 100 to provide a custom namespace within a pathname of file system protocol request that is configured to invoke semantically interpretative context as a command embedded in a file system protocol (e.g., NFS or CIFS) request (e.g., file system protocol request 290) issued by client 280 and directed to a logical construct (e.g., file or directory) served by the storage system, without alteration to the data access protocol. In this manner, the request need not deviate from the file system protocol (i.e., requests remain compliant with the protocol), while functionality is enhanced based on the commands via the custom namespace that may include operations on files as well as directories. The extension to the file system infrastructure includes a "plug-in" engine of a data access protocol server executing on a network protocol stack of the storage system. The network protocol stack on the server requires only minimal change to accommodate extraction of the pathname from a request for processing of the custom namespace, i.e., the engine extracts a command within the custom namespace of the file system infrastructure.

Figure 3:
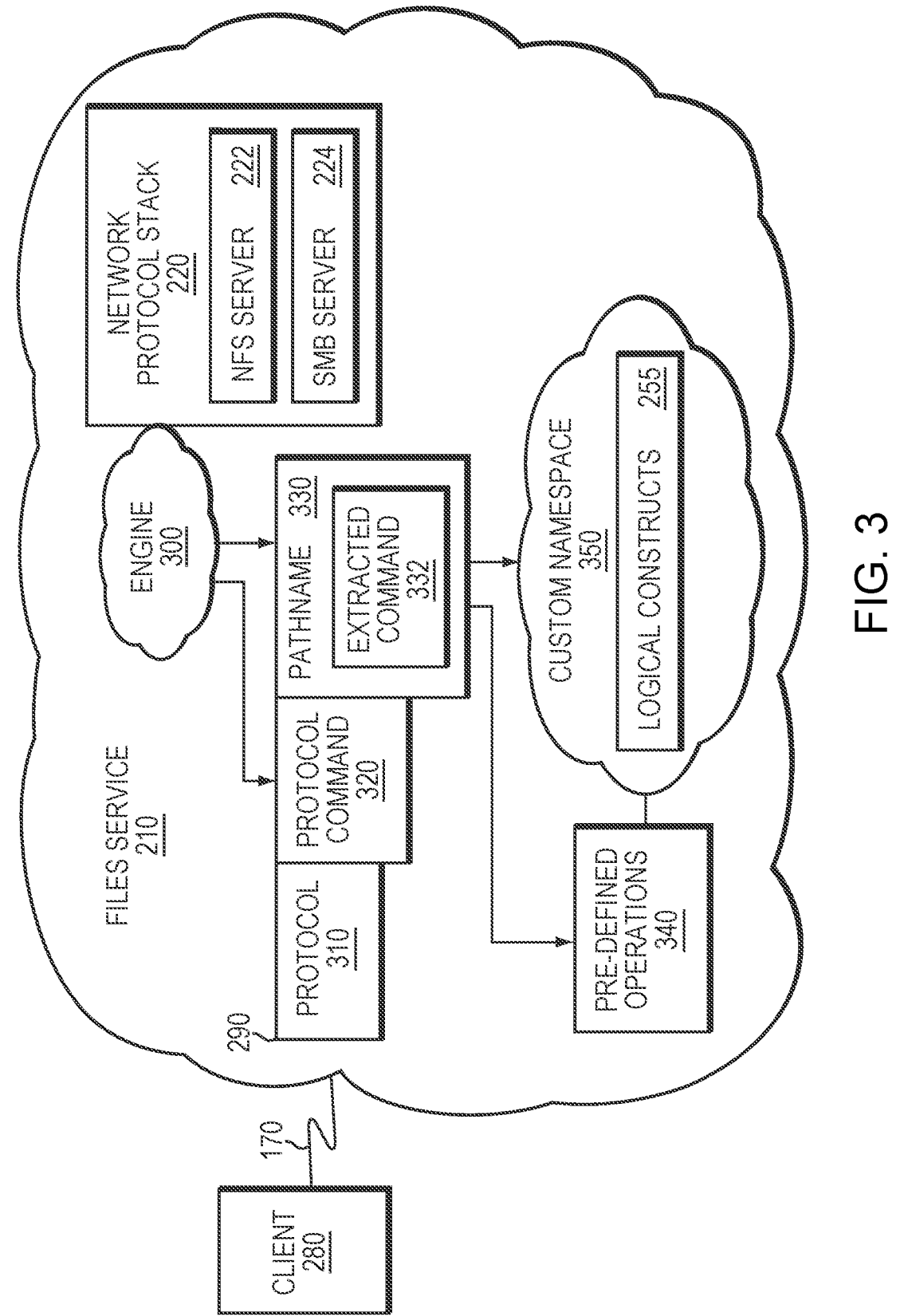
FIG. 3 is a block diagram of a technique for providing a custom namespace of the file system infrastructure.

FIG. 3 is a block diagram of a technique for providing a custom namespace of the file system infrastructure. The extension to the file system infrastructure 200 includes a "plug-in" engine 300 of a data access (e.g., file system) protocol server (e.g., NFS server 222) executing on network protocol stack 220 of files service 210. The engine 300 operates to extract a pathname 330 from the file system protocol request 290 to determine whether the command 332 extracted from the pathname is directed to a logical construct 255, e.g., a directory 270 or file 260, within custom namespace 350 of the file system infrastructure 200. Notably, the protocol command 320 may be used in conjunction with the extracted command 332 to further define one or more operations to be performed within the custom namespace. If so, the engine 300 semantically interprets the command 332 within a context of the custom namespace 350, i.e., the engine 300 essentially converts the command 332 to one or more predefined operations 340 directed to the logical construct 255 for execution by the storage system 100 to essentially offload the need for numerous data access protocol requests to perform those operations from the client 280. Note that the predefined operations may be complex or compound actions (e.g., scripts or program code) applied to the logical construct. In essence, a single file system protocol request having a pathname with an extractable command in the custom namespace may perform one or more of the predefined operations associated with the extracted command at the server and applied to the logical construct of the request, e.g., a single file, a directory, or an entire pathname hierarchy (i.e., an entire branch of a file system). In some embodiments, the extracted command 332 may act as a modifier to refine or qualify the protocol command 320. The storage system 100 then performs the operations and returns the results to the client 280.

In an embodiment, the predefined operations 340 may be conventional, well-known operations performed on data of the logical constructs 255 within, e.g., file system 240 of the storage system 100. The plug-in engine 300 that provides the predefined operations 340 is illustratively associated with file system protocol servers (e.g., NFS server 222, SMB server 224) of the network protocol stack 220 for improved efficiency. Illustratively, the engine 300 is embodied as a custom NFS/SMB extension software module that is integrated with the NFS/SMB protocol servers 222, 224 of the stack 220 such that when a custom namespace 350 is accessed, the servers 222, 224 may be invoked to perform the predefined operations 340 in a manner that is semantically different than the operation associated with the protocol command 320 in the request 290.

For example, a read, write, delete, or remove command 320 included in file system protocol request 290 may have a different meaning (i.e., may be qualified or refined) when executed in the custom namespace 350 according to the extract command 332. When the request 290 is directed (via pathname 330) to the custom namespace 350, the command 320 is semantically interpreted according to the extracted command 332 as, e.g., a unique or compound command having predefined operations 340 that are executed on the storage system 100. That is, the pathname 330 in the request 290 that is directed to the custom namespace 350 with the extractable command 332 changes the meaning of the protocol command 320 included in the request. More specifically, the technique changes the semantic context of the request 290 issued by the client 280 according to the file system protocol (e.g., NFS protocol) based on the pathname 330 included in the request. In this manner, the file system protocol can be functionally extended without actually changing its message layout by subverting a portion of the pathname namespace (i.e., the custom namespace) for a specific semantic meaning beyond an ordinary name as used in the protocol. Illustratively, such semantic interpretation obviates increased complexity of the NFS protocol over the network 170 by creating a different meaning for the command when accessing the custom namespace. As a result, a standard NFS request issued by client 280 that is destined (via a pathname) to the custom namespace 350 on the file system 240 has different command semantics applied to the contents of the namespace 350. The technique thus extends a file system protocol (e.g., NFS) without changing the protocol through use of the custom namespace 350, i.e., the custom namespace is used to extend the file system protocol.

Figure 4:
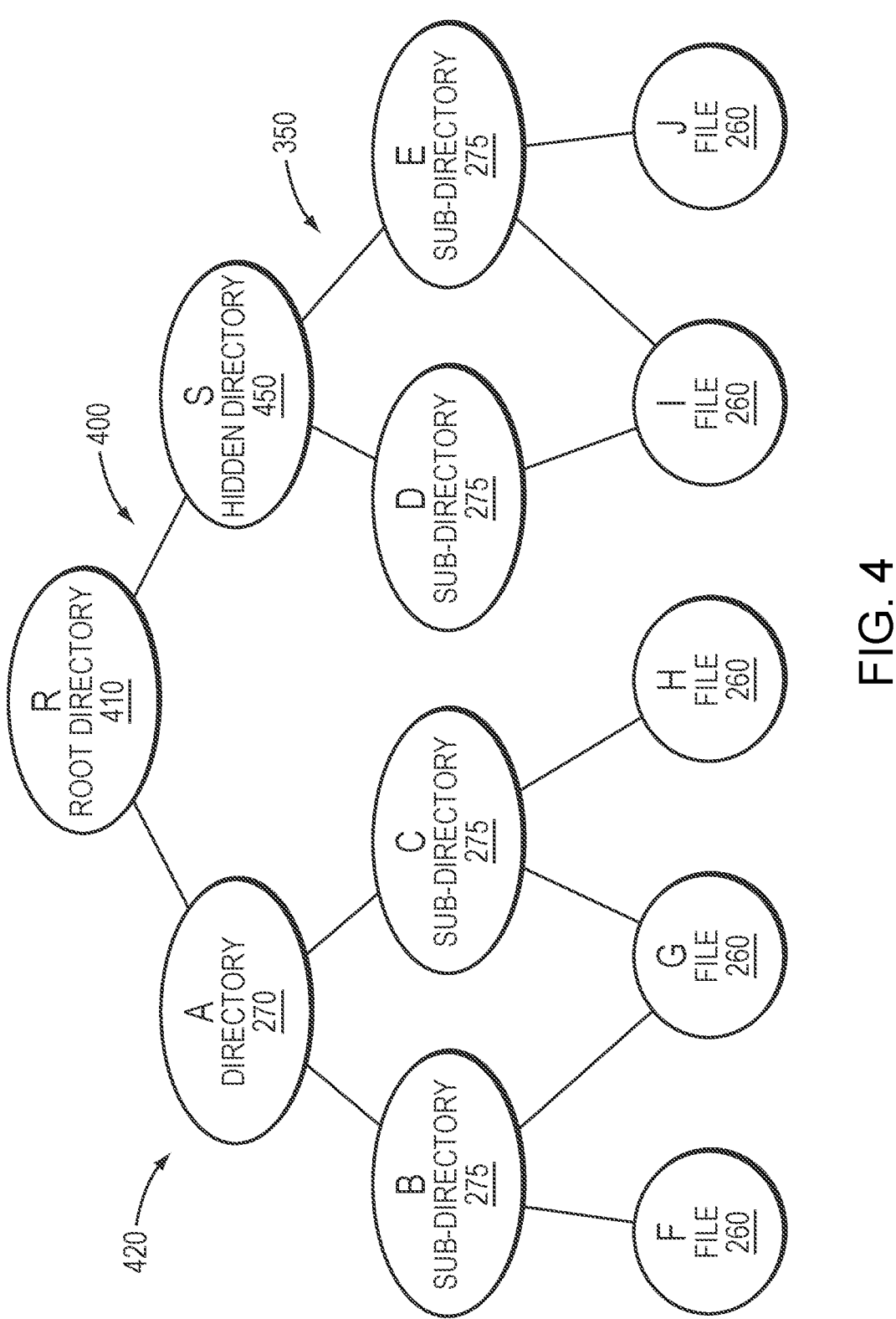
FIG. 4 is a block diagram of a directory structure used to implement the custom namespace.

In an embodiment, the custom namespace 350 is implemented as a hidden directory within a directory structure 400 of the file system 240. FIG. 4 is a block diagram of a directory structure used to implement the custom namespace. The directory structure 400 is illustratively implemented as a tree hierarchy with a set of linked constructs forming one or more directory trees 420. A top-level construct R in the directory structure represents a root directory 410 of the file system 240. Each construct in directory tree 420 represents, among others, a directory 270, a sub-directory 275, and a file 260. For example, construct A of tree 420 is a directory 270, and constructs B and C are sub-directories 275. Constructs F, G and H are files 260. In addition, a directory tree of the directory structure 400 may be implemented as a custom namespace hierarchy having one or more custom namespaces 350, each of which is implemented as a special (e.g., hidden) directory 450 with sub-directories 275 and files 260 of the file system 240. For example, construct S of custom namespace 350 is hidden directory 450, constructs D and E are sub-directories 275, and constructs I and J are files. Notably, a name of the hidden directory S may encode the extractable command 332 that may be applied to one or more objects within a branch hierarchy of the hidden directory S as the logical construct of the file system request. Exemplary implementations of the custom namespace 350 include a filtered filesystem view, such as recently accessed files, video files, images and the like. Exemplary implementations of other specific namespaces include a ".Trash" special directory presenting recently deleted files. Further exemplary implementations of the custom namespace include special directories ".remove" to remove/delete files and ".clone" to clone large files such as virtual machine images. Other examples may include performing operations on database files such as querying rows of a comma-separated values file.

Illustratively, the client 280 issues a request having a pathname (e.g., /.remove/dir1/file1) that includes one or more fully qualified paths to one or more custom namespaces 350 on the file system 240. The predefined operations 340 may be embodied as a script (e.g., a user-defined interpreted text file) accessed by plug-in engine 300 that operates on pathnames 330 of logical constructs 255 specified by the script and accessed by a file system protocol server. For example, when the client 280 issues a NFS request 290 including a protocol command 320 and pathname 330 directed to the custom namespace 350, the NFS server 222 invokes the engine 300 to (i) parse the pathname 330 to extract the command 332 from the request, and (ii) convert the protocol command 320 according to the extracted command 332 to one or more predefined operations 340 executed on the storage system 100. That is, the script is triggered to operate on the files or directories of the pathname 330 when the associated extracted command 332 is found in the pathname according to the protocol command 320.

Assume the request 290 is directed to accessing custom namespace 350 (e.g., ".remove" extractable command in the pathname) to remove sub-directories 275 and files 260 of hidden directory 450 for an NFS command 320 to remove directories (e.g., NFS RMDIR procedure) that is normally only applied for empty directories. The NFS request 290 may embody a format such as, e.g., protocol (e.g., NFS), command (RMDIR), hidden directory (e.g., /.remove), and various sub-directories (e.g., /dir1/dir2). Note that the hidden directory 450 may not be visible to directory queries that filter directories with certain encoded patterns (e.g., a dot as the first character of a name) but may be viewed for other directory queries according to parameters of the query or as set on the protocol server. In addition, the extractable command may be encoded within a hidden directory name according to a pattern for hiding filenames according to queries for the file system 240. As such, the custom namespace may exist as a hidden namespace within the storage system.

Upon parsing the pathname (e.g., /.remove/dir1/dir2) to identify the hidden directory 450 of custom namespace 350 and extract the command 332 from the name of the hidden directory, the plug-in engine 300 provides semantically interpretative context associated with the custom namespace 350 to convert the command 320 (e.g., RMDIR) to predefined operations 340 that, e.g., may (i) list constructs D, E sub-directories 275 of the hidden directory 450, and (ii)

recursively remove/delete those sub-directories 275 as well as constructs I and J files 260 of the directory 450 from the file system 240. In this manner, the NFS protocol RMDIR procedure that normally only removes empty directories is extended to apply to directories having files or other sub-directories without the client having to issue requests to remove each file and sub-directory individually for the directory sought to be removed beforehand.

Advantageously, the technique described herein provides functionality to off-load repeated data access protocol request(s) with concomitant post-processing operations from a client to the storage system 100 by using custom namespaces within pathnames of the request(s) to effectively extend the functionality of the request(s) at the server without otherwise changing a layout of the messages for the data access protocol (e.g., by encoding an extractable command within a custom namespace of the pathname in the request). That is, the technique provides predefined operations 340 for execution on the system 100 when accessing a logical construct 255 via a pathname 330 directed to a custom namespace 350 having an extractable command 332, which operations would otherwise be invoked at the server in numerous requests from the client, and may also involve fetching and parsing pathnames for files and directories (i.e., post-processing operations) performed at the client 280 to be able to issue those numerous requests. A filtered result of the operations is then provided to the client which appears semantically as a single operation. The technique thus conserves (saves) network bandwidth as well as compute resources (and time) on client 280 (as well as storage system 100) by essentially reducing the numerous requests issued from the client 280 to a single request for ganged operations on the stored data at the storage system. In other words, the technique essentially moves a compute cluster from the client to the storage system through the use of custom namespaces 350 using extractable commands 332 associated with predefined operations 340 that are more efficiently performed as a gang operation for a single request on the storage system 100.

The foregoing description has been directed to specific embodiments. It will be apparent however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor, the program instructions configured to:

receive, at a storage system, a standard data access protocol request issued by a client and having a protocol command and an extractable command encoded as text and embedded as a hidden directory within a pathname of a logical construct served by the storage system, wherein the hidden directory is a custom namespace interpreted by a protocol stack of the storage system configured to invoke semantically interpretative context to execute the extractable command directed to a sub-directory of the pathname according to the standard data access protocol;

parse the pathname to obtain the extractable command;

apply one or more predefined operations associated with the extractable command to the logical construct, wherein the extractable command is a command to one of (i) present one or more recently deleted files of the sub-directory, (ii) remove one or more files of the sub-directory, or (iii) clone one or more files of the sub-directory; and return results of the predefined operations to the client according to the data access protocol.

2. The non-transitory computer readable medium of claim 1, wherein the protocol command and the extractable command differ.

3. The non-transitory computer readable medium of claim 1, wherein the extractable command is encoded within a directory name of the hidden directory according to a pattern for hiding filenames for queries to the storage system.

4. The non-transitory computer readable medium of claim 1, wherein the custom namespace exists as a hidden namespace interpreted by the protocol stack of the storage system.

5. The non-transitory computer readable medium of claim 1, wherein the program instructions for execution on the processor are further configured to:

execute a plug-in engine of a data access protocol server of the protocol stack, wherein the engine operates to extract the pathname from the request to determine whether the custom namespace incorporating the extractable command is present and directed to the logical construct; and in response to determining that the custom namespace incorporating the extractable command is present, semantically interpret the extractable command at the engine and within a context of the custom namespace to convert the extractable command to the predefined operations directed to the logical construct.

6. The non-transitory computer readable medium of claim 1, wherein the logical construct is a directory and the predefined operations are applied to one or more files within the directory.

7. The non-transitory computer readable medium of claim 1, wherein the logical construct is a directory and the predefined operations are applied recursively to a directory hierarchy below a directory name encoding the extracted command.

8. The non-transitory computer readable medium of claim 1, wherein the standard data access protocol request includes the protocol command incorporated into the semantically interpretative context of the extractable command.

9. The non-transitory computer readable medium of claim 1, wherein the predefined operations are embodied as a user-defined script.

10. The non-transitory computer readable medium of claim 1, wherein the predefined operations filter file names based on a pattern match.

11. A method comprising:

receiving, at a storage system, a standard data access protocol request issued by a client and having a protocol command and an extractable command encoded as text and embedded as a hidden directory within a pathname of a logical construct served by the storage system, wherein the hidden directory is a custom namespace interpreted by a protocol stack of the storage system configured to invoke semantically interpretative context to execute the extractable command directed to a sub-directory of the pathname according to the standard data access protocol;

parsing the pathname using a plug-in engine of a data access protocol server executing on the protocol stack that is invoked when the custom namespace is accessed to obtain the extractable command;

applying one or more predefined operations associated with the extractable command to the logical construct, wherein the extractable command is a command to one of (i) present one or more recently deleted files of the sub-directory, (ii) remove one or more files of the sub-directory, or (iii) clone one or more files of the sub-directory; and returning results of the predefined operations to the client according to the data access protocol.

12. The method of claim 11, wherein the protocol command and the extractable command differ.

13. The method of claim 11, wherein the extractable command is encoded within a directory name of the hidden directory according to a pattern for hiding filenames for queries to the storage system.

14. The method of claim 11, wherein the custom namespace exists as a hidden namespace interpreted by the protocol stack of the storage system.

15. The method of claim 11 further comprising:

executing the plug-in engine of the protocol stack on the storage system, wherein the engine operates to extract the pathname from the request to determine whether the custom namespace incorporating the extractable command is present and directed to the logical construct; and in response to determining that the custom namespace incorporating the extractable command is present, semantically interpreting the extractable command at the engine and within a context of the custom namespace to convert the extractable command to the predefined operations directed to the logical construct.

16. The method of claim 11, wherein the logical construct is a directory and the predefined operations are applied to one or more files within the directory.

17. The method of claim 11, wherein the logical construct is a directory and the predefined operations are applied recursively to a directory hierarchy below a directory name encoding the extracted command.

18. The method of claim 11, wherein the standard data access protocol request includes the protocol command incorporated into the semantically interpretative context of the extractable command.

19. The method of claim 11, wherein the predefined operations are embodied as a user-defined script.

20. The method of claim 11, wherein the predefined operations filter file names based on a pattern match.

21. An apparatus comprising:

a storage system having a processor configured to execute program instructions to, receive, at the storage system, a standard data access protocol request issued by a client and having a protocol command and a pathname of a logical construct served by the storage system, wherein a custom namespace interpreted by a protocol stack of the storage system is configured to invoke semantically interpretative context as an extractable command encoded as text and embedded in the path-name independent from the protocol command and directed to the logical construct according to the standard data access protocol;

parse the pathname to obtain the extractable command;

apply one or more predefined operations associated with the extractable command to the logical construct, wherein the extractable command is a command to one of (i) present one or more recently deleted files of a sub-directory of the pathname, (ii) remove one or more files of the sub-directory, or (iii) clone one or more files of the sub-directory; and return results of the predefined operations to the client according to the data access protocol.

22. The apparatus of claim 21, wherein the extractable command is encoded in a directory name of the pathname within the custom namespace.

23. The apparatus of claim 21, wherein the extractable command is encoded within a hidden directory name according to a pattern for hiding filenames for queries to the storage system.

24. The apparatus of claim 21, wherein the custom namespace exists as a hidden namespace interpreted by the protocol stack of the storage system.

25. The apparatus of claim 21, wherein the program instructions for execution on the processor are further configured to:

execute a plug-in engine of a data access protocol server of a protocol stack executing on the storage system, wherein the engine operates to extract the pathname from the request to determine whether the custom namespace incorporating the extractable command is present and directed to the logical construct;

and in response to determining that the custom namespace incorporating the extractable command is present, semantically interpret the extractable command at the engine and within a context of the custom namespace to convert the extractable command to the predefined operations directed to the logical construct.

26. The apparatus of claim 21, wherein the logical construct is a directory and the predefined operations are applied to one or more files within the directory.

27. The apparatus of claim 21, wherein the logical construct is a directory and the predefined operations are applied recursively to a directory hierarchy below a directory name encoding the extracted command.

28. The apparatus of claim 21, wherein the standard data access protocol request includes the protocol command incorporated into the semantically interpretative context of the extractable command.

29. The apparatus of claim 21, wherein the predefined operations are embodied as a user-defined script.

30. The apparatus of claim 21, wherein the predefined operations filter file names based on a pattern match.

* * * * *